United States Patent
Illston et al.

(10) Patent No.: US 11,059,103 B2
(45) Date of Patent: Jul. 13, 2021

(54) ADDITIVE MANUFACTURING

(71) Applicant: Siemens Aktiengesellschaft, Munich (DE)

(72) Inventors: Trevor John Illston, Malvern (GB); Pratik Yatin Vora, Worcester (GB)

(73) Assignee: SIEMENS ENERGU GLOBAL GMBH & CO. KG, Munich (DE)

(*) Notice: Subject to any disclaimer, the term of this patent is extended or adjusted under 35 U.S.C. 154(b) by 23 days.

(21) Appl. No.: 16/480,700

(22) PCT Filed: Jan. 24, 2018

(86) PCT No.: PCT/EP2018/051733
§ 371 (c)(1),
(2) Date: Jul. 25, 2019

(87) PCT Pub. No.: WO2018/158009
PCT Pub. Date: Sep. 7, 2018

(65) Prior Publication Data
US 2019/0388969 A1    Dec. 26, 2019

(30) Foreign Application Priority Data
Feb. 28, 2017  (GB) ........................ 1703238

(51) Int. Cl.
*B22F 10/20*   (2021.01)
*B33Y 10/00*   (2015.01)
*B33Y 30/00*   (2015.01)

(52) U.S. Cl.
CPC ............. *B22F 10/20* (2021.01); *B33Y 10/00* (2014.12); *B33Y 30/00* (2014.12)

(58) Field of Classification Search
CPC ............ B22F 3/1055; B22F 2003/1058; B22F 2998/10; B22F 2999/00; B22F 3/24;
(Continued)

(56) References Cited

U.S. PATENT DOCUMENTS 8,684,069 B2 *  4/2014  Mottin ................... B22F 10/00
                                                        164/494
2013/0112366 A1  5/2013  Mottin et al.
(Continued)

FOREIGN PATENT DOCUMENTS

| EP | 2022622 A1 | 2/2009 |
| GB | 2458745 A | 10/2009 |
| WO | 2015088852 A1 | 6/2015 |

OTHER PUBLICATIONS

"Thermal Deburring and ElectroChemical Deburring", Additive Manufacturing Magazine—Feb. 27, 2013, Author Unknown.
(Continued)

*Primary Examiner* — Lawrence Averick

(57) ABSTRACT

A method of additive manufacturing metallic components, the method includes: forming a component in a layer by layer process, the component being formed integrally with at least one non-perforated support structure to be separated from the component after the layer by layer process, the support structure being formed with at least one wall that is non-perforated; and wherein after completion of the layer by layer process, the method includes exposing the component and support structure to at least one thermal pulse so as to weaken, or break, the interface(s) between the support structure and component prior to removal of the support.

22 Claims, 5 Drawing Sheets

(58) Field of Classification Search
CPC ......... B33Y 10/00; B33Y 30/00; Y02P 10/25;
B29C 64/40; C22F 1/10; C22F 1/11;
C21D 1/30; B21D 26/06; B23D 79/005
See application file for complete search history.

(56) References Cited

U.S. PATENT DOCUMENTS

| | | | |
|---|---|---|---|
| 2015/0197862 A1* | 7/2015 | Engel | C23F 1/04 |
| | | | 75/246 |
| 2016/0222791 A1* | 8/2016 | Rogers | B22F 10/00 |
| 2017/0057014 A1* | 3/2017 | Illston | B23K 26/342 |
| 2017/0066083 A1* | 3/2017 | Shioya | B33Y 10/00 |
| 2017/0297102 A1* | 10/2017 | Chin | B29C 64/20 |
| 2019/0255612 A1* | 8/2019 | Mark | F27B 17/0016 |
| 2020/0086580 A1* | 3/2020 | Kohler | B29C 64/40 |
| 2020/0254519 A1* | 8/2020 | Jones | B22F 3/24 |

OTHER PUBLICATIONS

International search report and written opinion dated May 15, 2018 for corresponding PCT/EP2018/051733.

* cited by examiner

FIG 2
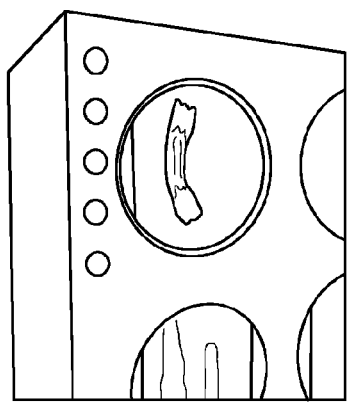
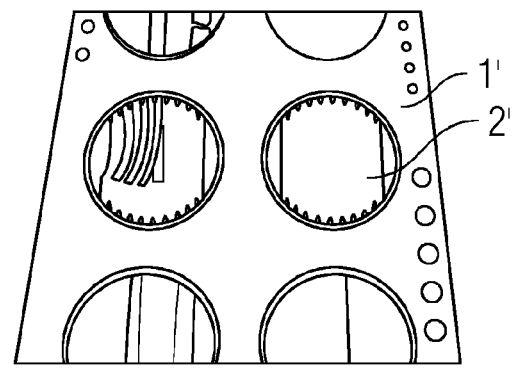
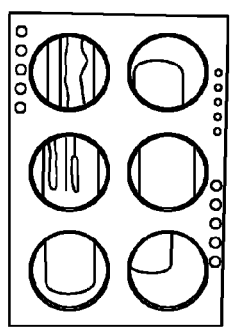
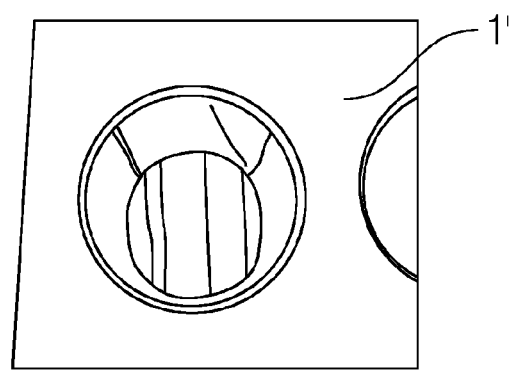
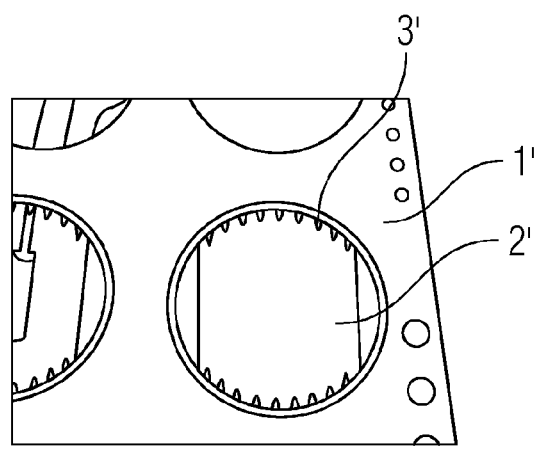

FIG 4
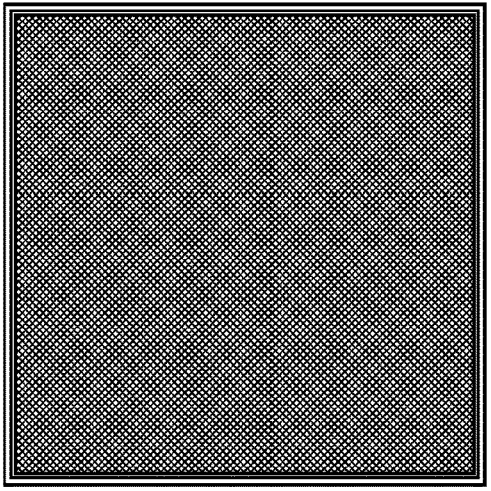
(a) 0.6mm Non-Fragmented Hatch
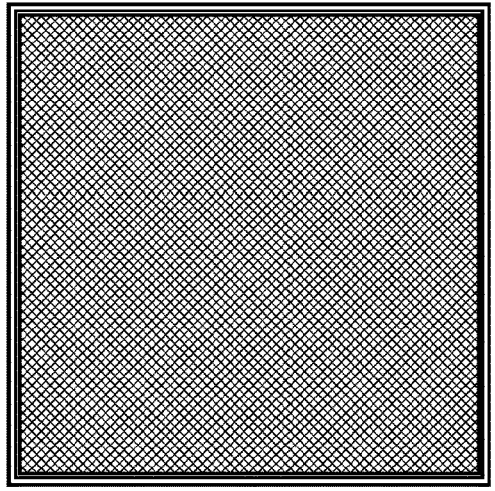
(b) 0.8mm Non-Fragmented Hatch
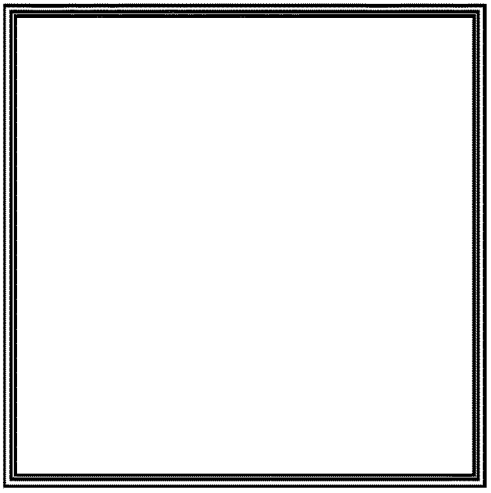
(c) Border only
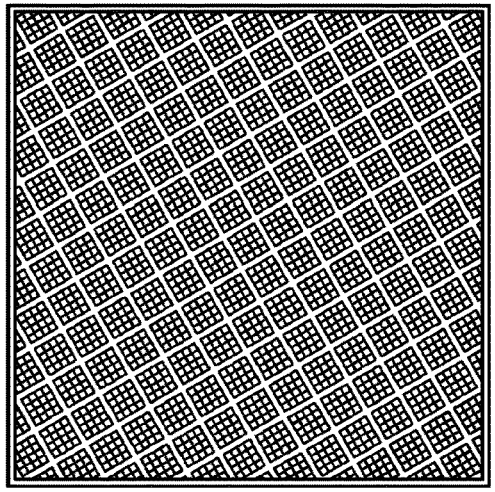
(d) Fragmented Hatch Only
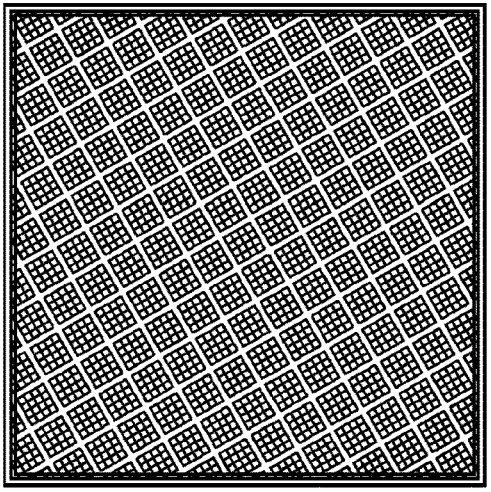
(e) Border with Fragmented Hatch
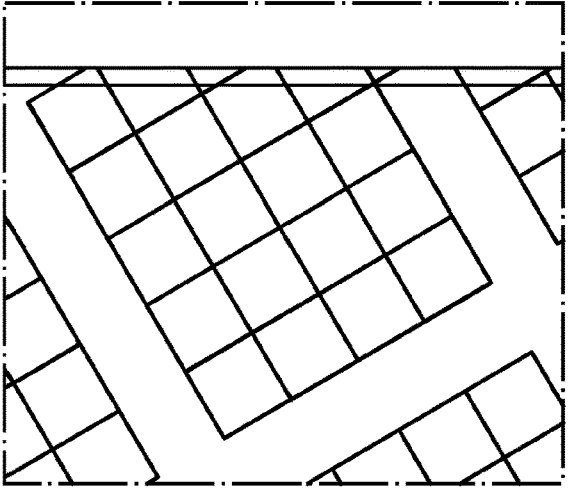
(f) Double Border with Fragmented Hatch

ADDITIVE MANUFACTURING

CROSS REFERENCE TO RELATED APPLICATIONS

This application is the US National Stage of International Application No. PCT/EP2018/051733 filed Jan. 24, 2018, and claims the benefit thereof. The International Application claims the benefit of GB Application No. 1703238.4 filed Feb. 28, 2017. All of the applications are incorporated by reference herein in their entirety.

FIELD OF INVENTION

The present invention relates to additive manufactured metallic components and in particular to methods for additive manufacturing metallic components involving the removal of support structures from such components.

BACKGROUND OF INVENTION

Additive Manufacturing is a group of processes characterised by manufacturing three-dimensional components by building up substantially two-dimensional layers (or slices) on a layer by layer basis. Each layer is generally very thin (for example between 20 to 100 microns) and many layers are formed in a sequence with the two dimensional shape varying on each layer to provide the desired final three-dimensional profile. In contrast to traditional "subtractive" manufacturing processes where material is removed to form a desired component profile, additive manufacturing processes progressively add material to form a net shape or near net shape final component.

The earliest Additive Manufacturing processes, such as Stereolithography, were based upon the curing of photopolymers using UV light and several techniques exist for forming plastic parts (including so called "3D printing" which is typically used to refer to Additive Manufacturing of plastics based upon modified inkjet type printing methods).

The Additive Manufacturing of metals presents significantly different issues to that of plastics and may be considered a distinct field by those skilled in the art. Metal powder bed Additive Manufacturing techniques are all based upon the basic principle of building a "slice" based upon a 3D CAD file by directing a point source of energy across the surface of a layer of metal powder. The energy spot is of sufficient intensity to locally melt (or sinter) the powder layer where it strikes it and creates a liquid melt pool (typically of a depth of that layer and at least half of the underlying layer of powder or, if there is a solid layer underneath, some of that underlayer). As the energy spot moves on (directed by the optics of the Additive layer manufacturing machine) the melt pool cools and the metal re-solidifies creating a contiguous whole of that layer and the underlayers. Upon completion of a layer, a new layer of powder is provided to allow the next slice to be formed.

Alternative metal Additive Manufacturing techniques may use powder (or wire) melted and applied as a liquid by mechanically scanning across a workpiece.

The point source of energy may for example be a laser or electron beam and several commercially available powder bed metallic additive manufacturing systems are known. For example including methods known and/or trade marked as 'selective laser sintering', selective laser melting, Laser Cusing (RTM) and DMLS (RTM). Examples of commercially available additive manufacturing machines for producing metallic components include, for example selective laser machines include the EOS M2XX or M4XX series (produced by EOS GmbH) and electron beam machines such as those produced by Acram AB of Sweden.

Additive manufacturing is capable of producing extremely complex parts at close to "net shape" but it will be appreciated by those in the art that support structures are generally required during manufacture. The support structures are integrally formed along with the component during additive manufacture on a layer-by-layer basis. For example, support structures may be required to sustain overhanging parts/surfaces. Support structures are particularly important in metallic components (especially high strength metals) since the heating and cooling necessary in the additive process creates residual stresses within the part which have the potential to causes geometric distortion and/or cracking of the part.

Support structures must be carefully designed and optimised during the pre-manufacturing process so as to be attached to the component with sufficient mechanical strength to function as intended, but also be relatively easy to remove after manufacture. Typically, the support structures may include a distinct interface region where they meet the component which has a lattice or toothed profile to provide a clearly defined separation line to the component. However, particularly for high performance metals (such as superalloys), the interface must be very strong and as a result the supports structure is difficult to remove. Sharp cutting tools are used with considerable force and there is a danger that the surface of component may be damaged during this removal process.

Supports that are designed to "snap off" the component are known. However, such supports generally are of no practical use for geometries larger than dental copings and crowns.

Supports that are easy to remove conventionally do not provide sufficient strength to withstand the stresses placed on them by the selective laser melting process.

Thus, there is a need for improved methods for the removal of support structures from metallic components produced by additive manufacturing.

SUMMARY OF INVENTION

Described herein is a method of removing a support structure from an additive manufactured metallic component, the method comprising exposing the component and support structure to at least one thermal pulse so as to weaken or break the interface(s) between the support structure and component prior to removal of the remaining support.

The present invention provides a method of additive manufacturing metallic components, the method comprising the steps of: forming a component in a layer-by-layer process, the component being formed integrally formed with at least one support structure to be separated from the component after the layer-by-layer process; and wherein after completion of the layer-by-layer process, the method comprises exposing the component and support structure to at least one thermal pulse so as to weaken or break the interface(s) between the support structure and component; and removing the remaining support from the component.

It will be appreciated that the support structure will have been integrally formed with the component during the layer-by-layer process. The mechanical removal of the support from the component may be by conventional means (for example cutting or machining and may include advanced cutting/machining methods such as electrical discharge machining).

The support structure may be formed with at least one non-perforated wall (i.e. formed with a wall containing no perforations, i.e. formed with a solid wall). Perforations are holes extending through the wall in the thickness direction. Support structure walls are conventionally formed with perforations in order to weaken the walls so they are easier to remove after the component has been formed.

The wall is advantageously formed with a thickness of 0.1 mm or less, advantageously between 0.05 and 0.1 mm, e.g. 0.1, 0.09, 0.08, 0.07, 0.06, or 0.05 mm.

The support structure may be formed with a plurality of walls. At least one wall of the plurality of walls is advantageously non-perforated. For example, each of the walls may be non-perforated. At least one wall, advantageously each of the walls, may be formed with a thickness of 0.1 mm or less, e.g. between 0.05 mm and 0.1 mm, e.g. 0.1 mm, 0.09 mm, 0.08 mm, 0.07 mm, 0.06 mm, or 0.05 mm.

The plurality of walls may be formed in a hatched (lattice) arrangement, i.e. the walls are arranged in a criss-cross pattern with voids contained between them, e.g. the walls are formed in two sets of parallel walls, the walls of one set crossing the walls of the other set at 90°. The hatch may be fragmented, i.e. arranged into discrete blocks of smaller sub-hatches. Such fragmentation may be described in terms of the arrangement of voids contained in each sub-lattice (e.g. 2×2, 3×3). The hatch pattern is advantageously fragmented into 2×2, 3×3, 4×4 or 5×5 blocks.

The walls are advantageously formed with a distance (advantageously centre-to-centre distance) between each wall of at least 0.8 mm, e.g. 0.8 mm, 0.9 mm, 1.0 mm, 1.1 mm, or 1.2 mm.

The support structure may comprise a bulk support member and the interface comprises a plurality of interface support members connecting between the bulk support member and the component. During the process of the invention the interface support members are weakened (or broken) by the thermal pulse prior to the mechanical removal of the support (for example by cutting).

The interface between the support structure and the component advantageously has a toothed profile. Each of the interface support members advantageously has a triangular or trapezoidal cross-section, wherein the length of the interface between the bulk support and the interface support member (the base length) is greater than the length of the interface between the component and the interface support member (the top length). In other words, the interface support member may narrow in width from the bulk support to the component.

Each interface support member may be formed with its narrowest width at the interface with the component. Alternatively, each interface support member may reach its narrowest width at a predetermined distance away from the interface with the component, e.g. 0.5 mm, 1 mm, 1.5 mm or 2 mm away from the interface with the component. Such interface support members are known as "breakaway" support members.

The ratio of the base length to the height of each interface support member (the height essentially being the distance between the bulk support and the component) may be equal to 1.5 or less, advantageously equal to 1 or less.

The base length to height ratio of the interface support members may be different depending on the location of the interface support member. For example, the support structure may comprise an internal support structure formed between two parts of the component and an external support structure formed between a baseplate and the component. In this case, interface support members of the internal support structure may have a base length to height ratio that is lower than the interface support members of the external support structure. For example, the base length to height ratio of the internal support structure may be between 0.55 and 0.75, advantageously 0.65 and the base length to height ratio of the external support structure may be between 1.2 and 1.4, advantageously 1.3.

The applicants have found that subjecting the component and support structure to a thermal pulse removes a surface layer and thereby reduces the strength of the interface (or may break at least some of the interface) between the support structure and component without having any notable adverse effect on the material properties of the component. In fact the thermal pulse may improve the fatigue properties of the component.

The thermal pulse is at a temperature exceeding the melting point of the metallic material. The thermal pulse may provide a peak temperature increase of at least 2000° C., for example an increase of between approximately 2500 to 3500° C.

The thermal pulse may be of insufficient duration to bulk heat the component.

The thermal pulse may for example be of less than 100 milliseconds in duration, for example less than 20 milliseconds in duration.

As the thermal pulse is of a relatively short duration the thermal conductivity into the bulk of the component is low. For example, due to the very short duration, the bulk component temperature may increase by only less than 200° C., for example by between approximately 50 to 150° C.

In contrast as the interface is formed of fine features they are subjected to a greater heat transfer. Without being bound by any particular theory it is, therefore, believed that the thermal pulse causes a localised (or selective) vaporisation, oxidation or melting of the interface features. Thus, the interface is weakened and in some parts may be broken and the support can be more easily removed.

The step of exposing the component and support structure to a thermal pulse comprises placing the component and support structure in a chamber, filling the chamber with a combustible gas mixture, allowing the gas mixture to surround the component and support structure and igniting the gas mixture. By allowing the gas mixture to fully mix with the structure and support prior to ignition the gas mixture may permeate any open spaces or voids within the component and support structure before combustion. In particular the gas mixture is able to permeate into the spaces or voids surrounding the interface. The gas mixture may be a mixture of a hydrocarbon (for example methane) and oxygen (which may for example be provided as air). For example, the gas mixture may comprise natural gas and air in a 1:1 ratio. The chamber may be at an increased atmospheric pressure (for example 400 bar and peak pressure during combustion may for example reach 2000 bar or more).

The combustion of the gas mixture may be such that the thermal pulse is an explosive or pseudo-explosive ignition.

The metallic component and support structure may be formed on a baseplate. As will be appreciated by those skilled in the art the component and support structure may essentially be welded to the baseplate during the additive manufacture process (as the first layer is formed on the baseplate). The support structure may be connected to the baseplate via line supports to enable powder to be removed from the support structure. Such line supports are described in UK patent GB2458745.

Prior to the removal of the support structure from the additive manufactured metallic component the embodiments may further comprise the step of heat treating the metallic component and the support structure to remove or reduce residual stresses induced the layer-by-layer process. In order to avoid distortion due to residual stress such heat treatment may be carried out prior to the removal of the component from the baseplate. The support structure and metallic component may be removed from the baseplate together and as such the heat treatment may take place prior to the removal of the support structure in accordance with embodiments of the invention.

It will be appreciated that a plurality of components and associated support structures may be formed on a single baseplate during a single additive process (and this would not impact the applicability of the present invention).

The skilled person will appreciate that the step of heat treating the additive manufactured component (typically whilst still attached to the base plate) is a known process for the removal/reduction of residual stress and is distinct from the thermal pulse of embodiments of the invention. For example, such heat treatment is typically carried out in under inert or vacuum atmospheric conditions (i.e. a non-oxidising environment). Further the heat treatment must be at a temperature below the melting point of the metallic material. During such heat treatment processes bulk heating (but not melting) of the component is intended to occur.

After mechanical removal of the support structure from the metallic component, at least one further thermal pulse may be applied to the separated metallic component. In some embodiments a plurality of thermal pulses may be applied post separation.

The applicants have, surprisingly, found that the application of a further thermal pulse after removal of the support structure provides an improved surface finish by reducing surface roughness. For example, this may reduce surface roughness resulting from remnants of the support structure interface or surface roughness of downward facing surfaces (which those in the art will appreciate may typically exhibit a degree of inherent roughness as a result of unintended powder melting below the layer desired).

The additional thermal pulse treatment of the separated component may be followed by the surface of the metallic component being abrasively cleaned. For example, the surface may be subject to abrasive blasting.

The abrasive cleaning removes the oxide produced by the thermal pulse treatment. Whilst not being bound by any particular theory, it is believed that the combination of the thermal pulse and subsequent abrasive treatment is particularly advantageous by at least partially oxidising, vaporising or melting the local fine peaks in the surface to enable or encourage their selective removal during the subsequent abrasive treatment.

The additive manufacturing process in accordance with embodiments of the invention may comprise powder bed selective laser manufacturing.

Whilst the invention has been described above, it extends to any inventive combination of features set out above or in the following description or drawings.

BRIEF DESCRIPTION OF THE DRAWINGS

Specific embodiments of the invention will now be described in detail, by way of example only, and with reference to the accompanying drawings in which:

FIG. 2 shows example metal parts formed by additive manufacturing with support structures both present and removed;

FIG. 4 show different arrangements of the wall(s) of the support structure;

DETAILED DESCRIPTION OF INVENTION

Figure 1:
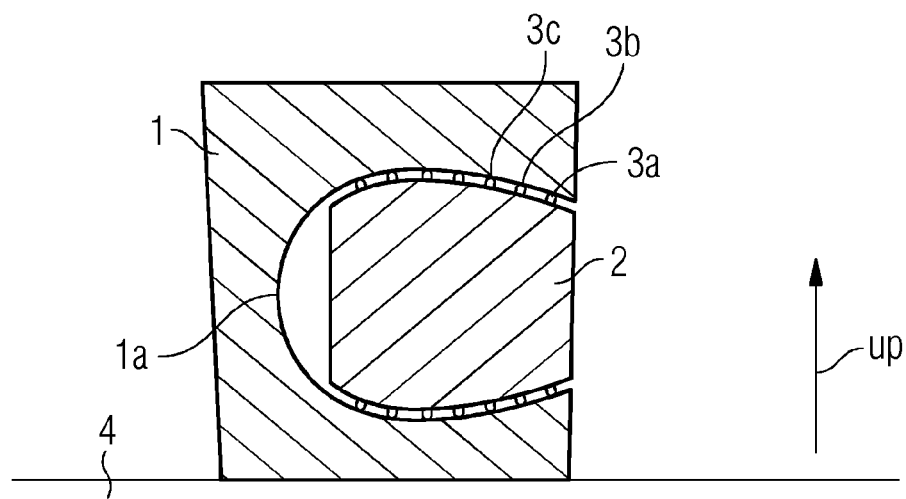
FIG. 1 is a schematic representation of a part manufactured by a conventional additive manufacturing method.

A schematic representation of a metal part 1 manufactured in an additive manufacturing method is shown in FIG. 1. The metal part is for example a casing and includes a cavity 1a within its body. The part 1 is formed by being built up on a layer-by-layer manner on a baseplate 4 in a manner which will be well known to those skilled in the art.

A bulk support structure 2 is provided within the cavity 1a of the part 1. The bulk support is arranged to be built relatively quickly during the additive layer manufacture but to have sufficient strength to resist the loads from the part 1 and, for example to resists geometric distortion of the part 1. The skilled person will appreciate that the support 2 may have any convenient (optimised) form and could be a solid or for example a lattice or honeycomb structure.

To ensure that the support 2 can be removed from the component 1 after manufacture it is provided with an interface 3 which forms a distinct "break line" between the support 2 and component 1. The interface may comprise a number of distinct, tooth like, interface members 3a, 3b, 3c which join the component 1 and support 2. It will be appreciated that the component 1, support 2 and interface 3 are all integrally formed on a layer-by-layer basis during the additive manufacturing process.

Some example drawings are shown in FIG. 2 to illustrate the removal of a support structure 2' from a component 1' using the method in accordance with embodiments of the invention. It may be noted that the drawings show the support 2' both in situ, partially removed and after removal (with remnants of an interface 3' showing).

Figure 3:
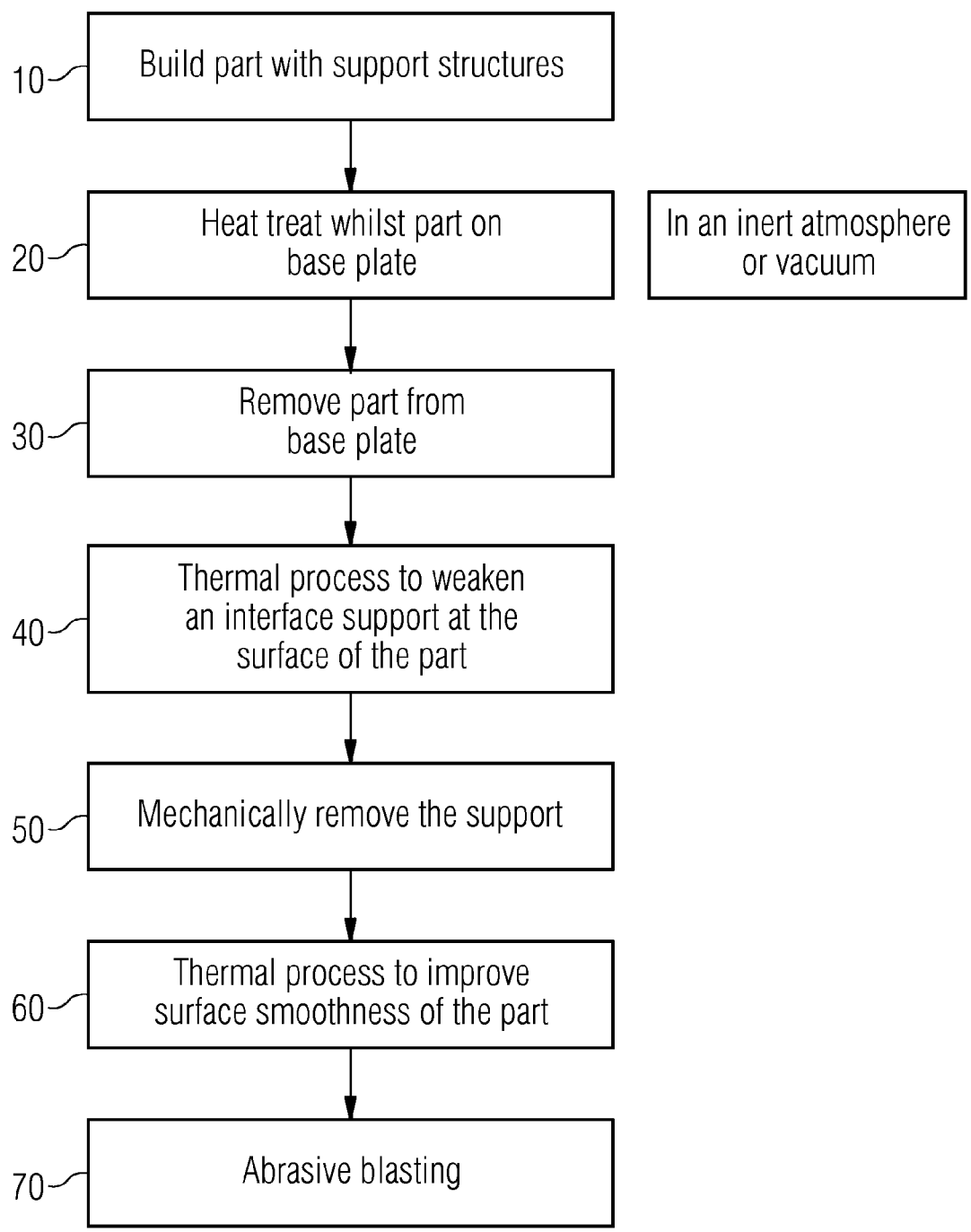
FIG. 3 shows a flow chart for the forming an additive manufactured component in accordance with embodiments of the invention.

The method in accordance with an embodiment of the invention is shown by the flow chart of FIG. 3. In the initial step 10 a component is built along with support structures by a known metallic additive manufacture process. A subsequent heat treatment 20 is applied to the part after removal from the additive layer manufacturing machine but with the part remaining attached to the baseplate to resist deformation. Alternatively or in addition to heat treatment step 20, a heat treatment step may be applied to the part after removal from the baseplate (e.g. between steps 50 and 60 mentioned below). This heat treatment is in a non-oxidising atmosphere (inert or vacuum) and is intended to reduce or minimise residual stresses.

With the residual stresses reduced by the heat treatment process 20, the component may be processed 30 to remove it from the baseplate (but will still have associated support structure attached or embedded within it).

After this removal the part and support structure are subjected to a thermal pulse process 40 to weaken the interfaces between the support and component. This thermal pulse is carried out in a sealed chamber at increased pressure. The chamber is filled with methane and air which is allowed to fully surround the component prior to ignition to provide extremely rapid and high temperature combustion (an explosive or pseudo explosive process). The thermal pulse may for example last approximately 20 milliseconds and result in an increase in temperature within the chamber of between 2500° C. and 3500° C. and a pressure spike of up to 2000 bar. The heat will strike the surfaces of the component and support structure but is of insufficient duration to cause bulk heating thereof. The thermal pulse step may for example be carried out using a conventional thermal deburring apparatus.

The thermal pulse step 40 has been found to weaken the interface parts 3 of the support 2 but since it does not cause any bulk heating of the component 1 it does not cause any change in its material properties. In contrast the interface parts are assumed to have a greater thermal conductivity so experience more significant surface oxidation and/or vaporisation and/or melting during the thermal pulse. This has been found to have provide a significant weakening of the interface and aid removal of the support (in step 50 below).

After the thermal pulse step 40, the support 50 is removed using any convenient mechanical processing step 50 (and the skilled person will appreciate that the particular mechanical process selected may depend upon several factors such as the material and geometry of the component and support).

Once the support has been fully removed it is normal to apply a final abrasive cleaning step 70 such as abrasive blasting to remove any remaining remnants of the interface members 3 from the separated component 1. In accordance with an embodiment prior to such abrasive blasting the component may optionally be subjected to a further thermal pulse step 60. The thermal pulse step 60 may include the application of a plurality of thermal pulses.

It has surprisingly been found that the application of this additional step 60 produces a greater reduction in final surface reduction. This appears to go directly against the teaching in the art since an advantage of utilising thermal pulses in known processes such as thermal deburring is that component surfaces should not be affected. When the method of an embodiment was applied to test pieces by the applicant it was found to demonstrate a reduced surface roughness (Ra measurement), measured using a surface profilometer following the subsequent abrasive blasting process 70, of at least 30% and typically 50% to 60%.

Without being bound to any particular theory, the applicants believe that the reduction in surface roughness is a result of the residual high points of the interface (and for example high points of roughness on downward faces) being vaporised, oxidised or melted by the thermal pulse creating a selectivity to the process and thereby enabling a smoothing to take place. The surface oxide than results from the thermal process is then removed by abrasive blasting.

Experiment

An experiment was carried out to study how various manufacturing parameters of the support structure affect the effectiveness of the thermal pulse in weakening or removing the support structure.

Figure 6:
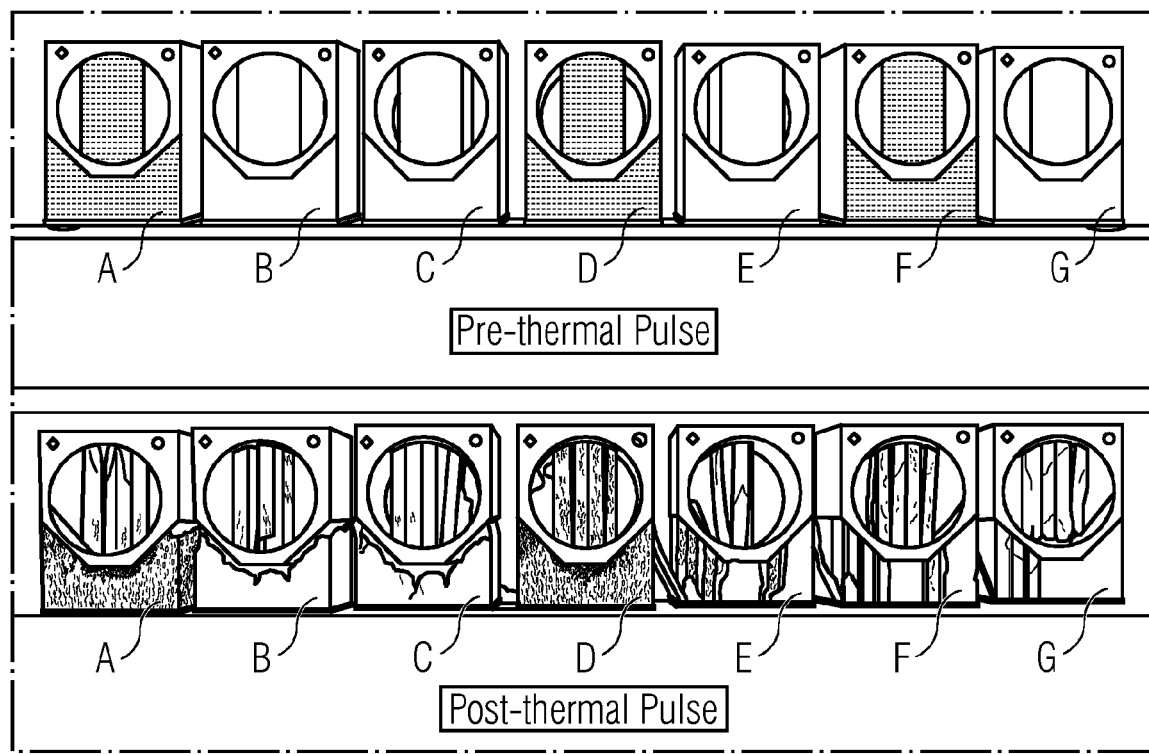
FIG. 6 shows sample components A-G before and after a thermal pulse has been performed.

Samples A to G were built on an EOS M270 selective laser melting powder bed 'additive manufacturing' machine (produced by EOS GmbH). The samples were formed using a nickel superalloy, Nimonic C263. This is a nickel alloy with high chromium content (approximately 20%). Samples A to G shown in FIG. 6.

Samples A to G comprised a cross section of a tube and were formed on a baseplate. "EOS supports" (as are known in this field) were formed inside the tube ("internal supports") and between the sample and the base plate ("external supports"). Each sample was 20 mm wide by 30 mm high with a hole of diameter 25 mm. Each sample was spaced from the baseplate by the outside supports to a minimum height of 10 mm above the baseplate.

The external supports were spaced from the baseplate by a series of line supports 1 mm high that enabled powder to be removed from the support structures. Such line supports are described in UK patent GB2458745.

The manufacturing parameters for the internal and external supports that were used for each sample are indicated in Table 1.

TABLE 1

| Sample | A | B | C | D | E | F | G |
|---|---|---|---|---|---|---|---|
| Internal supports | | | | | | | |
| x/y spacing (mm) | 0.8 | 0.8 | 0.8 | 0.8 | 0.8 | 0.8 | 0.8 |
| Hatching teeth | Wide | Wide | Narrow | Narrow | Narrow | Wide | Narrow |
| Hatching teeth breakaway | No | No | No | No | No | Yes | Yes |
| Border teeth | Wide | Wide | Narrow | Narrow | Narrow | Wide | Narrow |
| Border teeth breakaway | No | No | No | Yes | No | No | No |
| Fragmentation | Yes | Yes | Yes | Yes | Yes | Yes | Yes |
| Perforations | Yes | No | No | Yes | No | Yes | No |
| DMA border wall | No | No. | No | No | Yes | Yes | Yes |
| External supports | | | | | | | |
| x/y spacing (mm) | 0.6 | 0.6 | 0.6 | 0.6 | 0.8 | 0.8 | 0.8 |
| Hatching teeth | Wide | Wide | Narrow | Narrow | Wide | Narrow | Narrow |
| Hatching teeth breakaway | No | No | No | No | No | Yes | Yes |
| Border teeth | Wide | Wide | Narrow | Narrow | Wide | Narrow | Narrow |
| Border teeth breakaway | Yes | No | No | Yes | Yes | Yes | Yes |
| Fragmentation | No | No | No | No | No | No | No |
| Perforations | Yes | No | No | Yes | No | Yes | No |
| DMA border wall | No | No. | No | No | Yes | Yes | Yes |

The terminology used in Table 1 is from the "Magics" software produced by Materialise (of Leuven, Belgium) and is a de-facto industry standard.

FIGS. 4(a)-(f) shows possible arrangements of the walls of the support structure. Each line represents a wall.

The term "x/y spacing" refers to the distance between the walls. FIG. 4(a) shows a schematic of a support structure with an x/y spacing of 0.6 mm, and FIG. 4(b) shows a schematic of a support structure with an x/y spacing of 0.8 mm. A smaller spacing results in a higher density of walls.

FIGS. 4(a), (b), (d), (e) and (d) show examples of "hatching", which refers to a hatched (lattice) structure having walls criss-crossing at 90°, with voids contained between the walls.

Hatching may be fragmented into discrete blocks (FIGS. 4(*d*) and (*f*)) or continuous from border to border (FIGS. 4(*a*) and (*b*)). The fragmentation used in this experiment was 4×4, as shown in FIGS. 4(*d*)-(*f*).

Sections of hatching may be surrounded by perimeter walls, referred to as "borders" in Table 1. Borders may be doubled (i.e. two perimeter walls), as shown in FIG. 4(*f*).

The hatching and border wall thickness was set to approximately 0.1 mm and the x/y spacing between walls was set at 0.6 mm or 0.8 mm as indicated in Table 1.

For some samples, the walls of the support structure contained perforations, whereas for other samples, the walls were solid, i.e. contained no perforations.

Figure 5:
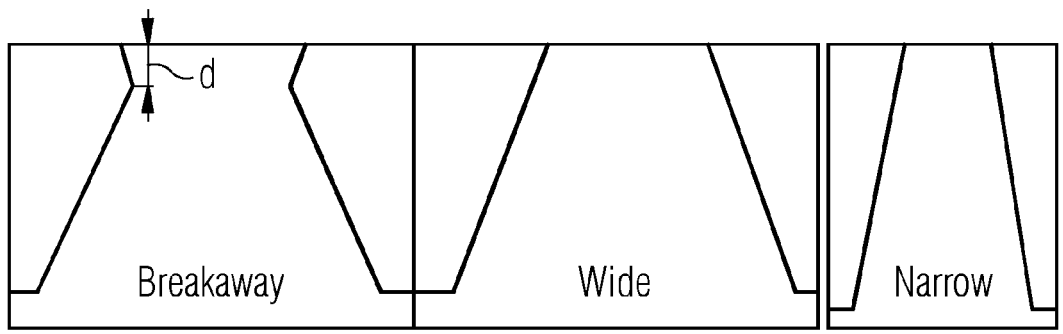
FIG. 5 show example interface support members.

Examples of interface support members, referred to as "teeth" in Table 1, are illustrated in FIG. 5. They are located at the extremities of the support structure, where the support structure meets the sample. In Table 1, 'wide' refers to a base length to height ratio of 1.3 and 'narrow' refers to a base length to height ratio of 0.65.

FIG. 5 also shows an example of a "breakaway". This refers to a narrowing of the teeth from the bulk support up to a predetermined distance d away from the component wall. In the experiment a distance of 0.1 mm was used for breakaways.

The above-described support removal process was carried out on all the samples using a single blast of natural gas and air in a 1:1 ratio at 12 bar pressure.

After the support removal process was carried out, the following observations were made:

All sample surfaces and supports were visibly oxidised ("burnt").

There was no visible evidence of damage to the sample (or baseplate) other than surface oxidation.

All supports had suffered structural damage, as desired.

Some of the supports had visibly melted (molten metal "blobs" were observed loosely attached to the baseplate and sample walls). This indicates that the temperature of the supports reached at least about 1500° C.

Consolidation/melting and bonding of supports was observed in high density areas.

The external supports were found to have been less affected by the thermal pulse than the internal supports.

The parts of the internal supports remaining after the thermal pulse (visible in FIG. 6) were loosely attached to the sample and could be removed easily with slight effort, e.g. with a fingernail. This is substantially different from unprocessed supports that require considerable physical effort and/or power tools to remove.

The internal support for sample E performed best (i.e. was easiest to remove from the sample after the thermal pulse), based on a subjective judgement.

Discussion of the Experimental Results

The supports most affected by the thermal pulse were the internal supports. The external supports, while weakened, did not respond as well as the internal supports, particularly at the end nearest the baseplate.

Without being bound by any theory it is suggested that the effectiveness of the thermal pulse in melting/vaporising supports is a function of the following.

Low thermal mass supports, or elements of elements (e.g. "teeth" and "breakaway") that can become hot enough to melt (or vaporise) due to the rapid rise in temperature of the surrounding gas and the poor thermal conductivity of the bulk material.

It is postulated from observations of the samples that explosive forces have built up inside some of the support structures. Where perforations or line supports are present the support has largely remained, though it may have destructively melted. However, where pressure from the ignition of the fuel-air mix has built up, the support has been physically blown away—particularly at its weakest point. It is therefore postulated that where the hot gases can dissipate more easily, the thermal pulse has less effect on the supports.

In particular, at the baseplate end of the external supports the thermal pulse may dissipate more easily due to the line supports between the external supports and the baseplate.

The thermal pulse process was less effective when the support structure has a higher density of walls (lower x/y spacing). It is postulated that having a higher density of walls allows less explosive gas mixture to infiltrate the support structure and/or makes the support structure stronger and more capable of withstanding the thermal pulse process. It is therefore suggested that to increase the effectiveness of the thermal pulse process, support structures having the thinnest walls with the largest x/y spacing required for their function as supports are used.

The 'non-perforated'+'fragmented' support structures showed the greatest dislodging from the sample after the thermal pulse process. It is postulated that non-perforated supports have better gas trapping compared to perforated supports which allow the explosive gas mixture to dissipate through the perforations.

Based on observation after the thermal pulse treatment of the supports, there was a reduction of approximately 80% of the manual force needed for complete removal of the supports.

The support removal process of this invention does not need to completely remove all supports to be of practical application. There is considerable benefit to substantially weakening the supports to ease their subsequent removal, particularly for thin-walled (e.g. 0.8 mm to 2 mm) components of high complexity with significant supports attached. In production, parts can get irreparably damaged in the conventional support removal process.

Although the invention has been described above with reference to a preferred embodiment, it will be appreciated that various changes or modifications may be made without departing from the scope of the invention as defined in the appended claims. For example, there may be more than one thermal pulse to process step 40 and some (or all) interface members 3*a*, 3*b*, 3*c* may be completely broken by the thermal pulse process step 40. Indeed the complete breaking of all interface members would be ideal—thereby allowing the simplest possible removal of the support (including by gravity). A limiting factor to interface breaking by additional thermal pulses may be an undesirable bulk heating of the part or simply cost and time—at some point it may be more desirable to mechanically cut the support away (including by unconventional methods such as electro discharge machining). In all regards though the support is mechanically removed; a thermal pulse does not of itself remove the support.

The invention claimed is:

1. A method of additive manufacturing metallic components, the method comprising:

forming a component in a layer-by-layer process, the component being formed integrally with at least one non-perforated support structure to be separated from the component after the layer-by-layer process, the support structure being formed with at least one wall that is non-perforated; and after completion of the layer-by-layer process, exposing the component and support structure to at least one thermal pulse so as to weaken, or break, an interface arranged between the support structure and component prior to removal of the support, wherein the support structure is formed with a bulk support member, and wherein the interface is formed by a plurality of interface support members for connecting the bulk support member to the component, wherein the width of the interface support members narrows from the bulk support member to the component, wherein the thermal pulse is at a temperature exceeding the melting point of the metallic material, wherein after mechanical removal of the support structure from the component, at least one further thermal pulse is applied to the separated component.

2. The method of claim 1, wherein the support structure is formed with a plurality of walls.

3. The method of claim 2, wherein a distance between each wall is at least 0.8 mm.

4. The method of claim 3, wherein a centre-to-centre distance between each wall is at least 0.8 mm.

5. The method of claim 1, wherein each of the walls is formed with a thickness of 0.1 mm or less.

6. The method according to claim 1, wherein each interface support member is formed with its narrowest width at the interface with the component.

7. The method according to claim 6, wherein each interface support member reaches its narrowest width at a predetermined distance away from the interface with the component, wherein the predetermined distance is between approximately 0.5 mm and approximately 2 mm away from the interface with the component.

8. The method according to claim 6, wherein the interface support members have a base length defined as the length of the interface between the bulk support member and the interface support member, and ratio of the base length to a height of the interface support member is equal to 1.5 or less.

9. The method according to claim 6, wherein: the component and support structure are formed on a baseplate;

the support structure comprises an internal support structure arranged between two parts of the component and an external support structure arranged between the component and the baseplate, the internal support structure and the external support structure both comprising a bulk support member and a plurality of interface support members;

the interface support members have a base length defined as the length of the interface between the bulk support member and the interface support member;

the base length to height ratio of the interface support members of the internal support structure is between 0.55 and 0.75; and the base length to height ratio of the interface support members of the external support structure is between 1.2 and 1.4.

10. The method of claim 1, wherein the step of exposing the component and support structure to a thermal pulse comprises placing the component and support structure in a chamber, filling the chamber with a combustible gas mixture, allowing the gas mixture to surround the component and support structure and igniting the gas mixture.

11. The method of claim 10, wherein the thermal pulse is an explosive or pseudo-explosive combustion.

12. The method of claim 10, wherein the chamber is at an increased atmospheric pressure of 400 bar and a peak pressure during combustion reaches 2000 bar or more.

13. The method of claim 1, wherein a plurality of thermal pulses are applied to the separated metallic component.

14. The method of claim 1, wherein the surface of the metallic component is abrasively cleaned after the application of at least one thermal pulse to the separated metallic component.

15. The method of claim 1, wherein the additive manufacturing process comprises powder bed selective laser manufacturing.

16. The method of claim 1, wherein the step of exposing the component and support structure to at least one thermal pulse provides a peak temperature increase of at least between approximately 2000° C. and approximately 3500° C.

17. The method of claim 1, wherein the step of exposing the component and support structure to at least one thermal pulse comprises the thermal pulse having a duration between approximately 20 milliseconds and approximately 100 milliseconds.

18. A method of additive manufacturing metallic components, the method comprising:

forming a component in a layer-by-layer process, the component being formed integrally with at least one support structure to be separated from the component after the layer-by-layer process, the support structure being formed with at least one wall having a thickness of 0.1 mm or less; and after completion of the layer-by-layer process, exposing the component and support structure to at least one thermal pulse so as to weaken, or break, an interface arranged between the support structure and component prior to removal of the support, wherein after mechanical removal of the support structure from the component, at least one further thermal pulse is applied to the separated component.

19. A method of additive manufacturing metallic components, the method comprising:

forming a component in a layer-by-layer process, the component being formed integrally with at least one support structure to be separated from the component after the layer-by-layer process, the support structure being formed with a plurality of walls, wherein a distance between each wall is at least 0.8 mm; and after completion of the layer-by-layer process, exposing the component and support structure to at least one thermal pulse so as to weaken, or break, an interface arranged between the support structure and component prior to removal of the support, wherein after mechanical removal of the support structure from the component, at least one further thermal pulse is applied to the separated component.

20. The method of claim 19, wherein each of the plurality of walls is non-perforated.

21. The method of claim 19, wherein the plurality of walls are formed in a hatched arrangement.

22. The method according to claim 21, wherein the plurality of walls are formed in a hatched arrangement fragmented into discrete smaller hatched sub-arrangements.

* * * * *